(12) United States Patent
Ariyoshi et al.

(10) Patent No.: US 8,037,751 B2
(45) Date of Patent: Oct. 18, 2011

(54) FLOW RATE MEASURING APPARATUS

(75) Inventors: Yuji Ariyoshi, Chiyoda-ku (JP); Masahiro Kawai, Chiyoda-ku (JP); Koji Tanimoto, Chiyoda-ku (JP); Hiroyuki Uramachi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/760,194

(22) Filed: Apr. 14, 2010

(65) Prior Publication Data

US 2011/0088464 A1     Apr. 21, 2011

(30) Foreign Application Priority Data

Oct. 19, 2009 (JP) .................. 2009-240079

(51) Int. Cl.
    *G01F 1/68* (2006.01)
(52) U.S. Cl. .................................. 73/204.27
(58) Field of Classification Search ... 73/204.21–204.27
    See application file for complete search history.

(56) References Cited

U.S. PATENT DOCUMENTS

| 5,631,416 | A |   | 5/1997 | Rilling et al. |           |
|-----------|---|---|--------|----------------|-----------|
| 5,894,088 | A | * | 4/1999 | Sawada et al.  | 73/204.19 |
| 6,223,594 | B1| * | 5/2001 | Takiguchi et al.| 73/204.21|
| 7,434,460 | B2| * | 10/2008| Matsuura et al.| 73/204.22 |

FOREIGN PATENT DOCUMENTS

| JP | 09050830     |    | 2/1997  |
|----|--------------|----|---------|
| JP | 3609094      | A  | 3/1997  |
| JP | 2000162011   |    | 6/2000  |
| JP | 2004258047   |    | 9/2004  |
| JP | 2006153694   |    | 6/2006  |
| JP | 2009-008619  | A  | 1/2009  |
| JP | 2009008619   |    | 1/2009  |
| WO | 02095339     | A1 | 11/2002 |

OTHER PUBLICATIONS

Japanese Office Action issued in Application No. 2009-240079 dated Jun. 7, 2011.

* cited by examiner

*Primary Examiner* — Jewel V Thompson
(74) *Attorney, Agent, or Firm* — Sughrue Mion, PLLC

(57) ABSTRACT

The flow rate measuring apparatus includes a connector portion, a main body portion, a bypass passage, a flow rate sensing element having a flow rate detection portion, a control circuit, a pair of metal terminals having end portions connected to a connector, embedded portions molded integrally with a resin portion constituting the main body portion, and exposed portions exposed in the main passage, which are connected to each other in a cascade manner, and a fluid temperature sensing element having a temperature sensing portion. The fluid temperature sensing element is arranged at a position apart from an outer wall surface of a side face of the bypass passage, and the temperature sensing portion is arranged at the center between the pair of metal terminals that are exposed in the main passage by the same length or between extension lines thereof.

14 Claims, 9 Drawing Sheets

FLOW RATE MEASURING APPARATUS

BACKGROUND OF THE INVENTION

1. Field of the Invention

The present invention relates to a flow rate measuring apparatus which is suitable for measuring an intake air amount of an internal combustion engine, for example.

2. Description of the Related Art

As a conventional flow rate measuring apparatus, there is a one which is inserted in a pipe through an apparatus inserting hole formed in the pipe so as to measure the flow rate of fluid flowing in a main passage (see, for example, Japanese Patent Application Laid-Open No. 2009-8619). A connector is formed on the proximal end of the flow rate measuring apparatus so as to protrude to the outside of the pipe, and a measuring passage is formed on the distal end of the same so that a flow rate sensing element is arrange inside the measuring passage. Further, a circuit board with a built-in control circuit is arranged between the connector and the measuring passage.

The measuring passage and the circuit board are inserted inside the pipe, and a part of the fluid flowing in the main passage enters the measuring passage through a flow inlet, flows on a surface of the flow rate sensing element, flows out through a flow outlet, and joins the fluid flowing in the main passage. The flow rate sensing element is provided with a heater, which is supplied with electric current from the circuit to generate heat. Further, the heater contacts the fluid flowing on the surface and is cooled by the fluid so that a variation of resistance corresponding to the flow rate of the fluid is detected.

A fluid temperature sensing element for sensing temperature of the fluid is arranged substantially at the center of the main passage outside the measuring passage at a vicinity of the flow rate sensing element arranged inside the measuring passage. The fluid temperature sensing element is electrically connected by welding to end portions of terminals exposed to the main passage. The other end portions of the terminals also work as connector terminals, and parts other than the both end portions are molded integrally with a base portion.

The conventional flow rate measuring apparatus having the above-mentioned structure can provide the following two effects.

(1) It is possible to prevent the fluid temperature sensing element from causing turbulence by itself in the fluid flowing close to the flow rate sensing element because the fluid temperature sensing element is arranged outside the measuring passage.

(2) It is possible to avoid an influence of heat inside an engine room or heat of the circuit board itself because the fluid temperature sensing element is arranged at substantially the center of the main passage that is apart from the inner wall of the pipe.

However, the conventional technique has the following problem.

The conventional flow rate measuring apparatus has no countermeasure against a break of a wire of the fluid temperature sensing element or deformation or breakage due to an external force when vibration is applied to the pipe.

In other words, in the case of the conventional flow rate measuring apparatus, if vibration is applied to the pipe, the flow rate measuring apparatus is vibrated so that the terminals and the fluid temperature sensing element are also vibrated together. For instance, in the supporting structure of the fluid temperature sensing element as illustrated in FIG. 1 of Japanese Patent Application Laid-Open No. 2009-8619, one of the terminals is longer than the other terminal. Therefore, the vibration of the longer terminal becomes larger than that of the shorter terminal As a result, a bending stress is concentrated on the joint portion between the shorter terminal and the fluid temperature sensing element. A lead wire of the fluid temperature sensing element is usually very thin as a few hundred microns. Therefore, if such a bending stress is applied repeatedly, the lead wire may be broken.

In addition, when the flow rate measuring apparatus is inserted into the pipe through the apparatus inserting hole, the fluid temperature sensing element may contact the wall of the pipe so that the lead wire or the terminal of the fluid temperature sensing element may be bent or broken.

Further, when the flow rate measuring apparatus is handled, a part where the fluid temperature sensing element is arranged may be grabbed by mistake so that the lead wire or the terminal of the fluid temperature sensing element may be bent or broken.

SUMMARY OF THE INVENTION

The present invention has been made for solving the above-mentioned problems, and it is an object of the present invention to provide a flow rate measuring apparatus capable of improving both measurement accuracy and mechanical strength of the fluid temperature sensing element.

A flow rate measuring apparatus according to the present invention includes: a connector portion arranged outside a main passage in which fluid to be measured flows, for sending and receiving a signal externally; a main body portion which is extended from the connector portion to an inside of the main passage; a bypass passage which is formed inside the main body portion and to which a part of the fluid to be measured flowing in the main passage is led to flow; a flow rate sensing element which is arranged inside the bypass passage and has a flow rate detection portion on a surface thereof; a control circuit which drives the flow rate sensing element and processes a detection signal; a pair of metal terminals each of which includes an end portion connected to the connector, an embedded portion molded integrally with a resin portion constituting the main body portion, and an exposed portion exposed in the main passage, which are connected to each other in a cascade manner; and a fluid temperature sensing element which is electrically connected between the exposed portions of the pair of metal terminals and includes a temperature sensing portion for sensing temperature of the fluid to be measured, in which the fluid temperature sensing element is arranged at a position apart from an outer wall surface of a side face of the bypass passage, and the temperature sensing portion is arranged at a center between the pair of metal terminals exposed in the main passage by the same length or between extension lines thereof.

According to the flow rate measuring apparatus of the present invention, the fluid temperature sensing element is arranged at a position that is apart from the outer wall surface of a side face of the bypass passage, and further the temperature sensing portion is arranged at the center between the pair of metal terminals that are exposed by the same length in the main passage or between the extension lines thereof. Thus, it is possible to provide the flow rate measuring apparatus that can improve both measurement accuracy and mechanical strength of the fluid temperature sensing element.

DETAILED DESCRIPTION OF THE PREFERRED EMBODIMENTS

Hereinafter, preferred embodiments of the flow rate measuring apparatus according to the present invention are described with reference to the attached drawings.

Embodiment 1

Figure 1:
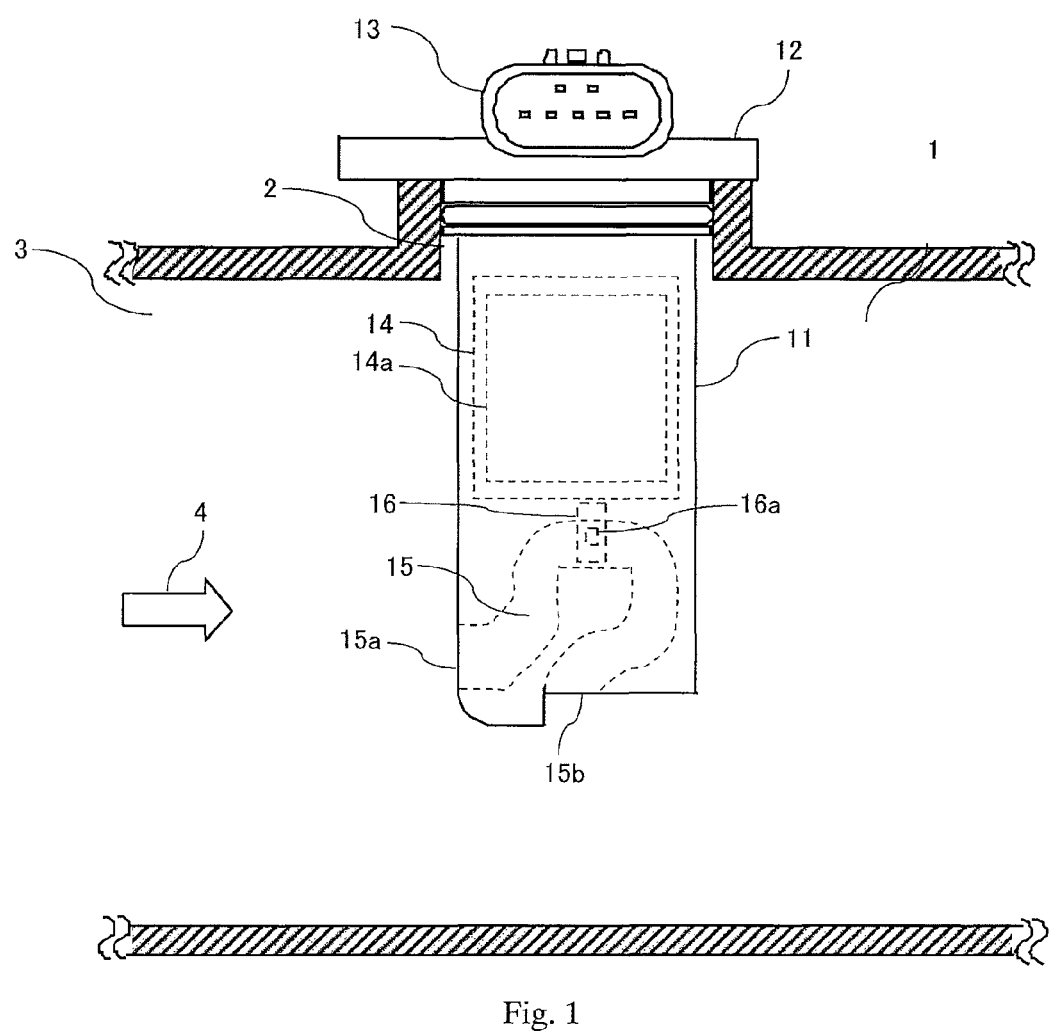
FIG. 1 is a front view illustrating the flow rate measuring apparatus according to Embodiment 1 of the present invention, which is installed to a pipe of an internal combustion engine.

FIG. 1 is a front view illustrating the flow rate measuring apparatus according to Embodiment 1 of the present invention, which is installed to a pipe of an internal combustion engine. A main body portion 11 of the flow rate measuring apparatus 10 is inserted into a pipe 1 through an apparatus inserting hole 2, and a flange portion 12 of the same is fixed to the pipe 1. The main body portion 11 is provided with a connector portion 13, a circuit housing portion 14, and a bypass passage 15 along the insertion direction into the pipe 1.

A flow rate sensing element 16 having a detection portion 16a on the surface thereof is arranged inside the bypass passage 15. In addition, a circuit board 14a is housed in the circuit housing portion 14, and a control circuit for driving the flow rate sensing element 16 and processing a signal from the same is mounted on the circuit board 14a. A power supply for driving the circuit and a flow rate signal are connected externally through a connector portion 13.

The bypass passage 15 includes a flow inlet 15a and a flow outlet 15b. The flow inlet 15a faces the upstream side of the main stream direction 4 of the fluid to be measured that flows in the main passage 3, and the flow inlet 15a is opened in the surface of the main body portion 11 that is perpendicular to the main stream direction 4. In addition, the flow outlet 15b is opened in the surface of the main body portion 11 that is parallel to the main stream direction 4 and is perpendicular to the insertion direction.

A part of the fluid to be measured flows in the bypass passage 15 through the flow inlet 15a so that a flow rate thereof is measured by the detection portion 16a of the flow rate sensing element 16 arranged in the bypass passage 15, and then flows out through the flow outlet 15b to join the main stream.

Figure 2:
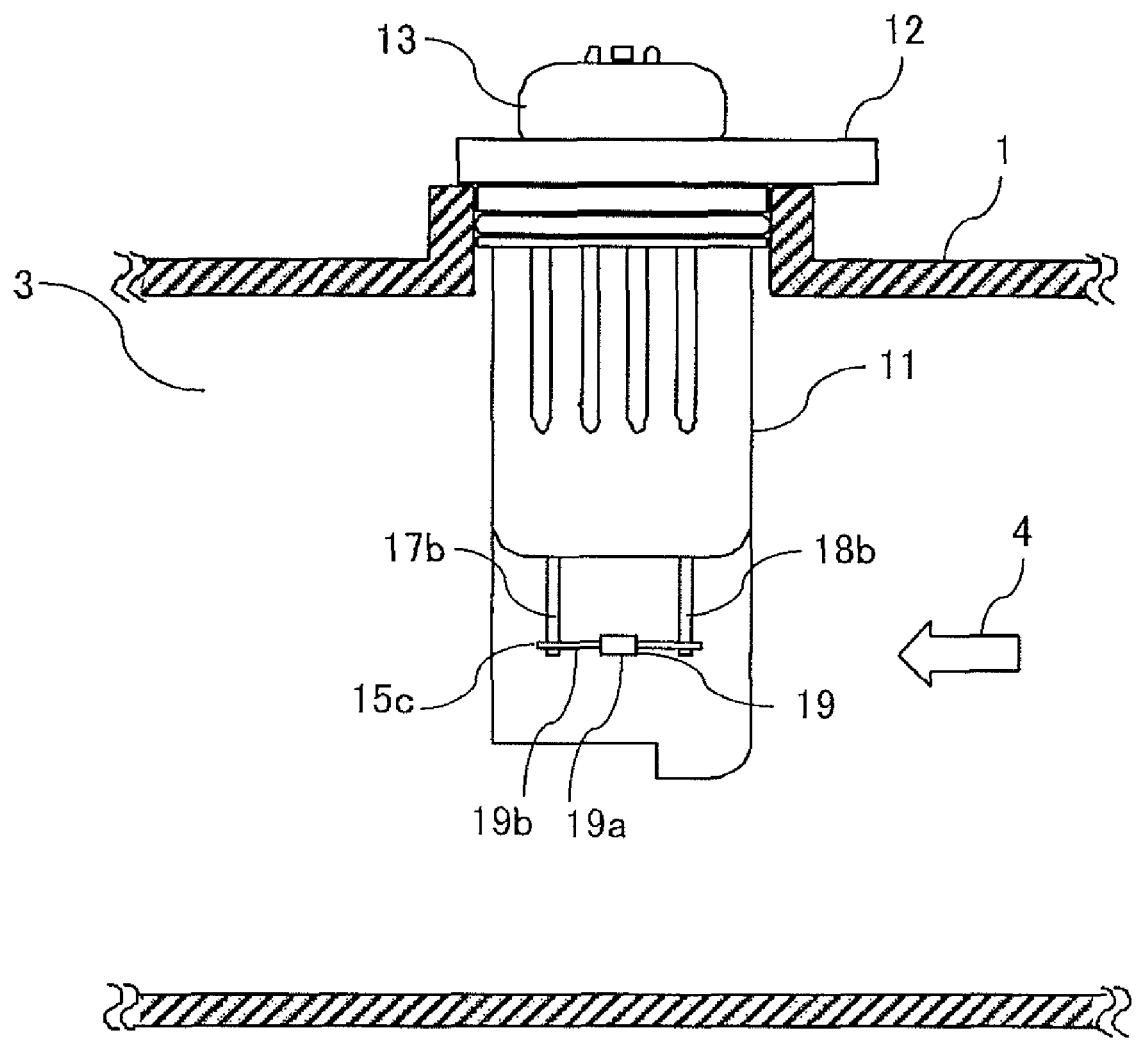
FIG. 2 is a rear view illustrating the flow rate measuring apparatus according to Embodiment 1 of the present invention, which is installed to a pipe of the internal combustion engine.
Figure 3:
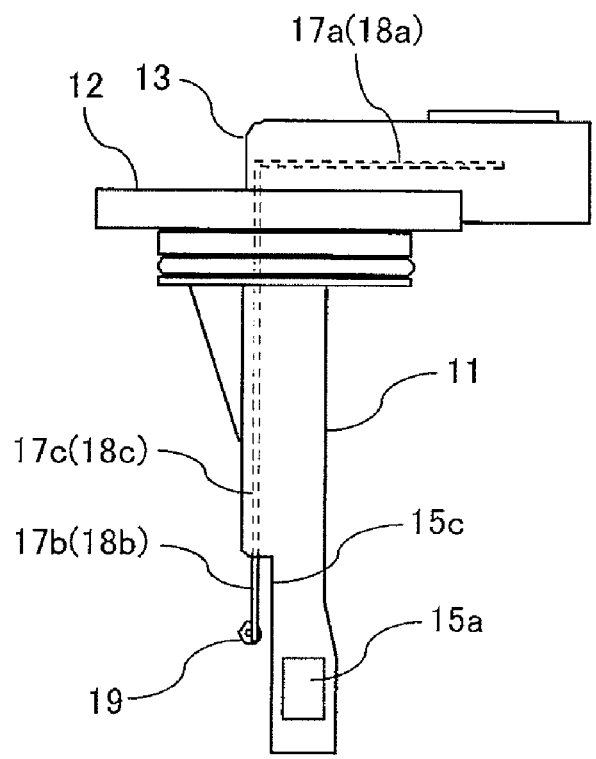
FIG. 3 is a diagram of the flow rate measuring apparatus according to Embodiment 1 of the present invention, viewed from upstream in a main stream direction.

FIG. 2 is a rear view illustrating the flow rate measuring apparatus 10 according to Embodiment 1 of the present invention, which is installed to a pipe 1 of an internal combustion engine. In addition, FIG. 3 is a diagram of the flow rate measuring apparatus 10 according to Embodiment 1 of the present invention, viewed from upstream in a main stream direction. A fluid temperature sensing element 19 for sensing temperature of the fluid flowing in the main passage 3 is arranged at a position that is outside the bypass passage 15 and is apart from an outer wall surface 15c of a side face of the bypass passage 15.

Lead wires 19b of the fluid temperature sensing element 19 are electrically connected to exposed portions 17b and 18b of the metal terminals 17 and 18 that are exposed to the main passage 3 by welding or other method. Note that each of the metal terminals 17 and 18 is constituted of an end portion 17a or 18a connected to the connector portion 13, an embedded portion 17c or 18c that is molded integrally with a resin portion of the main body portion 11, and the exposed portion 17b or 18b exposed to in the main passage 3, which are connected in a cascade manner as illustrated in FIG. 3.

Then, the exposed portions 17b and 18b of the metal terminals 17 and 18 are exposed at the position opposed to the main stream by the same length in the direction that is perpendicular to the main stream direction 4 and is parallel to the insertion direction of the main body portion 11. Further, the temperature sensing portion 19a of the fluid temperature sensing element 19 is arranged at substantially the center between the exposed portions 17b and 18b of the metal terminals 17 and 18 or between the extension lines thereof.

The end portions 17a and 18a of the metal terminals 17 and 18 also work as electric connection terminals in the connector portion 13 so as to have a role of sending and receiving an electric signal externally. In addition, embedded portions 17c and 18c of the metal terminals 17 and 18 are molded integrally with a resin portion of the main body portion 11.

Figure 4:
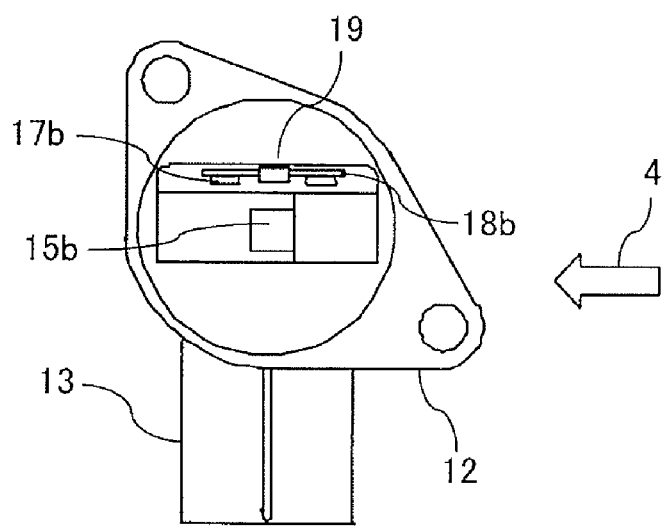
FIG. 4 is a diagram of the flow rate measuring apparatus according to Embodiment 1 of the present invention, viewed from a distal end in the insertion direction of the main body portion.

FIG. 4 is a diagram of the flow rate measuring apparatus 10 according to Embodiment 1 of the present invention viewed from the distal end of the main body portion 11 in the insertion direction. The exposed portions 17b and 18b of the metal terminals 17 and 18 are arranged so that the width direction thereof becomes substantially parallel to the main stream direction 4.

In the flow rate measuring apparatus 10 having the structure described above, the fluid temperature sensing element 19 is arranged at a position that is outside the bypass passage 15 so that the fluid temperature sensing element 19 itself does not cause turbulence in the fluid flowing close to the flow rate sensing element 16. Therefore, the flow rate measuring apparatus 10 can detect air flow rate correctly without being affected by the turbulence.

In addition, the fluid temperature sensing element 19 is also apart from the inner wall of the pipe 1 and the circuit housing portion 14. Thus, it is possible to detect fluid temperature more accurately with little influence of heat inside the engine room and heat of the circuit board 14a itself.

Figure 5:
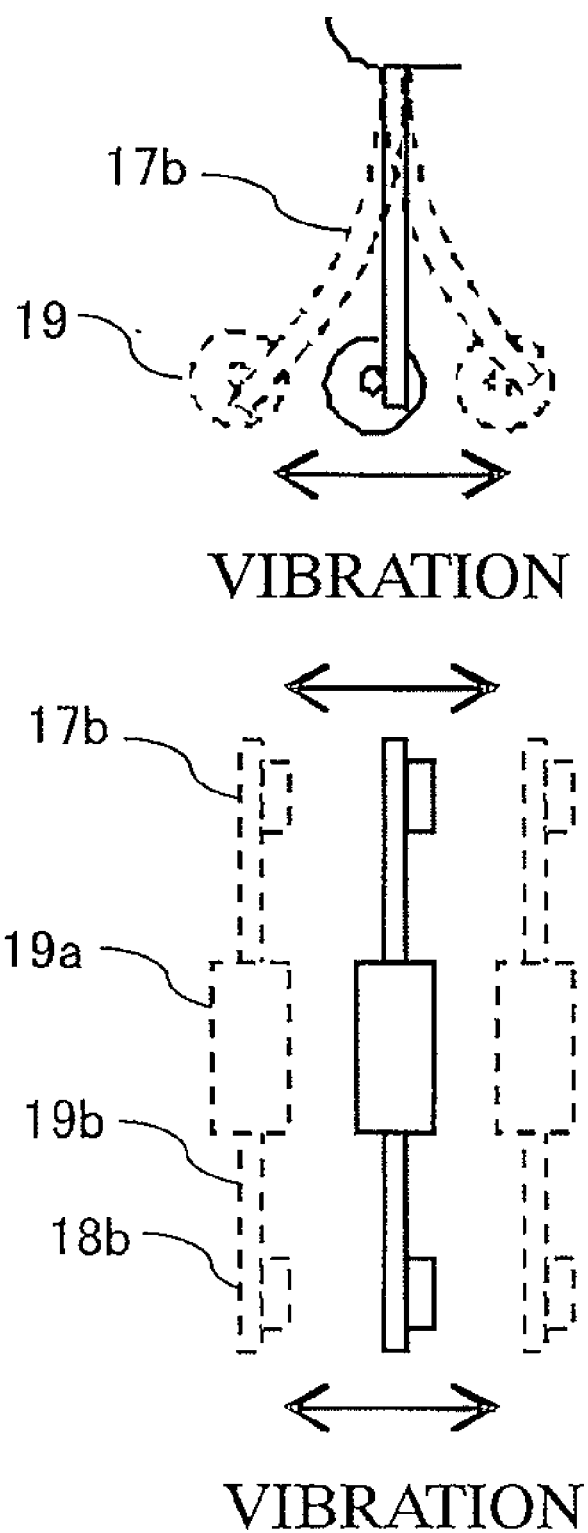
FIG. 5 is an explanatory diagram illustrating deformation of metal terminals and a fluid temperature sensing element in the flow rate measuring apparatus according to Embodiment 1 of the present invention.

Further, in the flow rate measuring apparatus 10 having the structure described above, deformation of the exposed portions 17b and 18b of the metal terminals 17 and 18 and the fluid temperature sensing element 19 when vibration is applied to the pipe 1 is described. FIG. 5 is an explanatory diagram illustrating deformation of the metal terminals and the fluid temperature sensing element in the flow rate measuring apparatus 10 according to Embodiment 1 of the present invention. It is supposed that the pipe 1 is vibrated in the plane perpendicular to the main stream direction 4 and in the direction perpendicular to the insertion direction of the main body portion 11. In this case, in accordance with the vibration, the exposed portions 17b and 18b of the metal terminals 17 and 18 and the fluid temperature sensing element 19 are vibrated as illustrated in FIG. 5.

In the present invention, the exposed portions 17b and 18b of the metal terminals 17 and 18 are arranged so as to be exposed to the main stream by the same length. Further, the temperature sensing portion 19a of the fluid temperature sensing element 19 is arranged substantially at the center between the exposed portions 17b and 18b of the metal terminals 17 and 18 or between the extension lines thereof. Therefore, the exposed portions 17b and 18b are deformed in the same direction by the same phase and the same amount.

As a result, the temperature sensing portion 19a of the fluid temperature sensing element 19 and the lead wires 19b on both side thereof are deformed in the same direction by the same phase and the same amount. Therefore, a stress is not concentrated on a specific part of the lead wire 19b, and a risk of breakage of wire due to vibration can be avoided.

In addition, the exposed portions 17b and 18b of the metal terminals 17 and 18 are arranged so that the width direction thereof becomes substantially parallel to the main stream direction 4. Therefore, when the fluid temperature sensing element 19 is bonded, a larger area of bonded surface can be secured compared with the case where the width direction of the exposed portions 17b and 18b is perpendicular to the main stream direction 4. As a result, the bonding strength can be increased. On the other hand, if the width direction of the exposed portions 17b and 18b is perpendicular to the main stream direction 4, it is necessary to bend the lead wires 19b of the fluid temperature sensing element 19 for increasing the area of bonded surface. In this case, unnecessary stress is applied to the lead wires 19b.

Further, if the width direction of the exposed portions 17b and 18b of the metal terminals 17 and 18 is substantially parallel to the main stream direction 4, turbulence hardly occurs in the main stream compared with the case where it is perpendicular to the same. As a result, the flow rate measuring apparatus 10 becomes more resistant to being affected by the turbulence in the main stream.

As described above, according to Embodiment 1, the fluid temperature sensing element is arranged at a position that is apart from the outer wall surface of the side face of the bypass passage, and further the temperature sensing portion is arranged at the center between the metal terminals exposed in the main passage by the same length or between the extension lines thereof. Thus, both measurement accuracy and mechanical strength of the fluid temperature sensing element can be improved. Further, a pressure loss that occurs in the exposed portion of the metal terminal can also be decreased.

Embodiment 2

Figure 6:
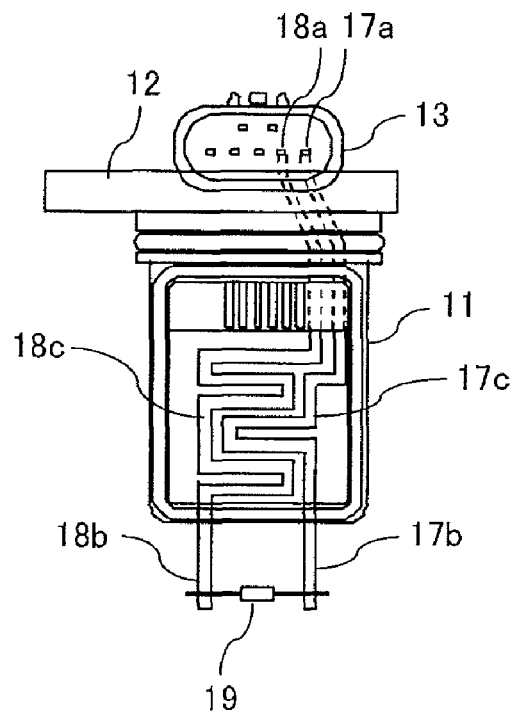
FIG. 6 is a front view of a flow rate measuring apparatus according to Embodiment 2 of the present invention.

FIG. 6 is a front view of the flow rate measuring apparatus according to Embodiment 2 of the present invention. In FIG. 6, cover portions of the bypass passage 15 and the circuit housing portion 14 are removed so that features of shapes of the metal terminals 17 and 18 can easily be understood. In this Embodiment 2, the embedded portions 17c and 18c of the metal terminals 17 and 18 that are molded integrally with the resin portion of the main body portion 11 have a meandering shape (zigzag shape). Other structures are the same as Embodiment 1 described above.

Because the embedded portions 17c and 18c of the metal terminals 17 and 18 have a meandering shape so that the lengths thereof are increased, thermal resistances of the portions are increased. Thus, heat in the engine room outside the pipe 1 is hardly transferred to the fluid temperature sensing element 19 via the metal terminals 17 and 18. As a result, the influence of heat inside the engine room to the fluid temperature sensing element 19 can be decreased.

As described above, according to Embodiment 2, the thermal resistance of the metal terminal is increased by its structure, and hence the influence of heat inside the engine room to the fluid temperature sensing element can be decreased. As a result, the increase of measurement accuracy of the flow rate measuring apparatus described above in Embodiment 1 can be realized more effectively.

Embodiment 3

Figure 7:
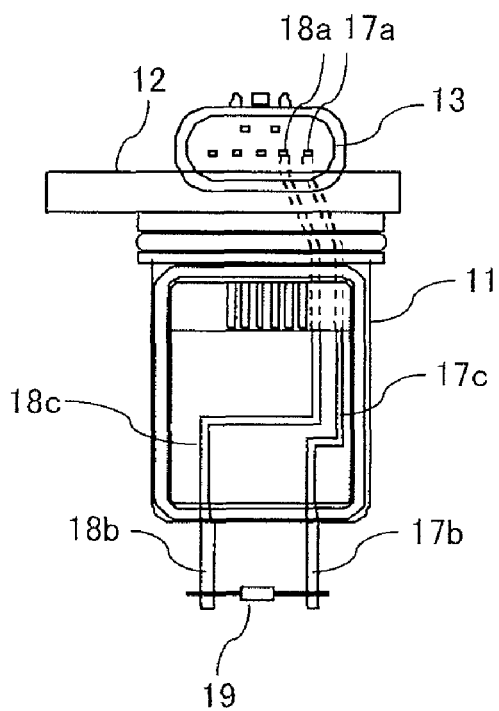
FIG. 7 is a front view of a flow rate measuring apparatus according to Embodiment 3 of the present invention.

FIG. 7 is a front view of the flow rate measuring apparatus according to Embodiment 3 of the present invention. In FIG. 6, cover portions of the bypass passage 15 and the circuit housing portion 14 are removed so that features of shapes of the metal terminals 17 and 18 can easily be understood. In this Embodiment 3, the embedded portions 17c and 18c of the metal terminals 17 and 18 that are molded integrally with the resin portion of the main body portion 11 have a width at least smaller than the widths of the exposed portions 17b and 18b. Other structures are the same as Embodiment 1 described above.

As a method for increasing thermal resistances of the metal terminals 17 and 18, there is considered a method of decreasing the width thereof so that an area of heat conduction is decreased. However, if the width of the exposed portions 17b and 18b that are exposed to the main stream is decreased, the mechanical strength is lowered. Therefore, the widths of the exposed portions 17b and 18b cannot be decreased below a predetermined width for maintaining the strength. On the other hand, the embedded portions 17c and 18c are molded integrally with the resin portion of the main body portion 11. Therefore, there is no problem in strength if the width thereof is decreased.

Therefore, in this Embodiment 3, the widths of the embedded portions 17c and 18c of the metal terminals 17 and 18 that are molded integrally are decreased while the widths of the exposed portions 17b and 18b that are exposed to the main stream are increased, and hence thermal resistance of the entire metal terminals 17 and 18 are increased. By increasing the thermal resistance in this way, heat in the engine room outside the pipe 1 is hardly transferred to the fluid temperature sensing element 19 via the metal terminals 17 and 18. As a result, the influence of heat inside the engine room to the fluid temperature sensing element 19 can be decreased.

Further, by increasing the widths of the exposed portions 17b and 18b of the metal terminals 17 and 18 that are exposed to the main stream, it is possible to decrease the width of the embedded portions 17c and 18c of the metal terminals 17 and 18 that are integrally molded while maintaining the mechanical strength of the exposed portions 17b and 18b so that a desired thermal resistance can be obtained.

As described above, according to Embodiment 3, it is possible to obtain the same effect as Embodiment 2 described above. Further, by increasing the width of the embedded portion for obtaining the mechanical strength while decreasing the width of the embedded portion, the metal terminal having a desired thermal resistance can easily be designed.

Embodiment 4

Figure 8:
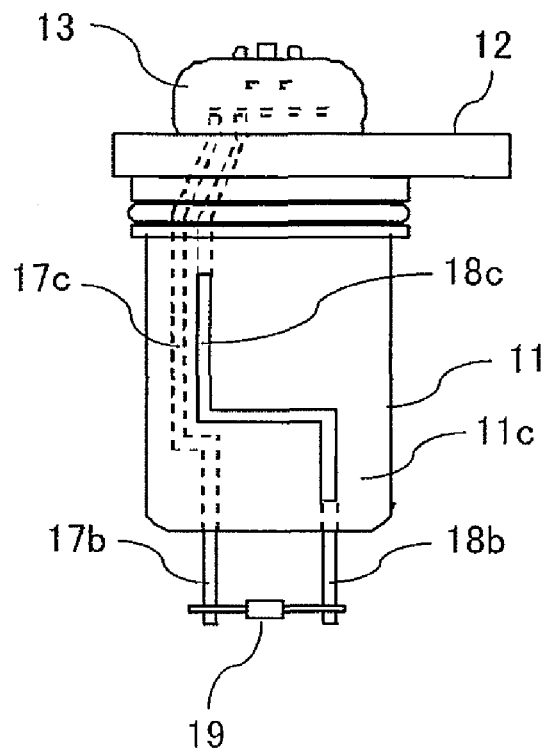
FIG. 8 is a rear view of a flow rate measuring apparatus according to Embodiment 4 of the present invention.

FIG. 8 is a rear view of the flow rate measuring apparatus according to Embodiment 4 of the present invention. In this Embodiment 4, one of the embedded portions 17c and 18c of the metal terminals 17 and 18, e.g., the embedded portion 18c is exposed to the outer wall surface 11a of the main body portion 11 so as to be opposed to the fluid to be measured that flows in the main passage 3. Other structures are the same as those in Embodiment 1 described above.

Because a part of the embedded portion 18c of the metal terminal 18 is exposed to the fluid to be measured, heat that is transferred to the fluid temperature sensing element 19 via the metal terminal 18 can be dispersed to the main stream by the heat transfer with the main stream. Thus, it is possible to decrease influence of heat inside the engine room or heat from the circuit board 14a to the fluid temperature sensing element 19.

As described above, according to Embodiment 4, a part of the embedded portion 18c of the metal terminal is exposed to the fluid to be measured. As a result, it is possible to decrease influence of heat inside the engine room or heat from the circuit board to the fluid temperature sensing element, and the improvement of measurement accuracy of the flow rate measuring apparatus described above in Embodiment 1 can be realized more effectively.

Note that in the Embodiment 4 described above, the structure of only one of the embedded portions is exposed to the main stream. This is because that if both the embedded portions are exposed to the main stream, the metal terminals may be short-circuited with each other due to moisture or conductive dust. Therefore, if the risk of the short circuit can be avoided by certain means, it is possible to adopt a structure in which both the metal terminals are exposed to the main stream.

Embodiment 5

Figure 9:
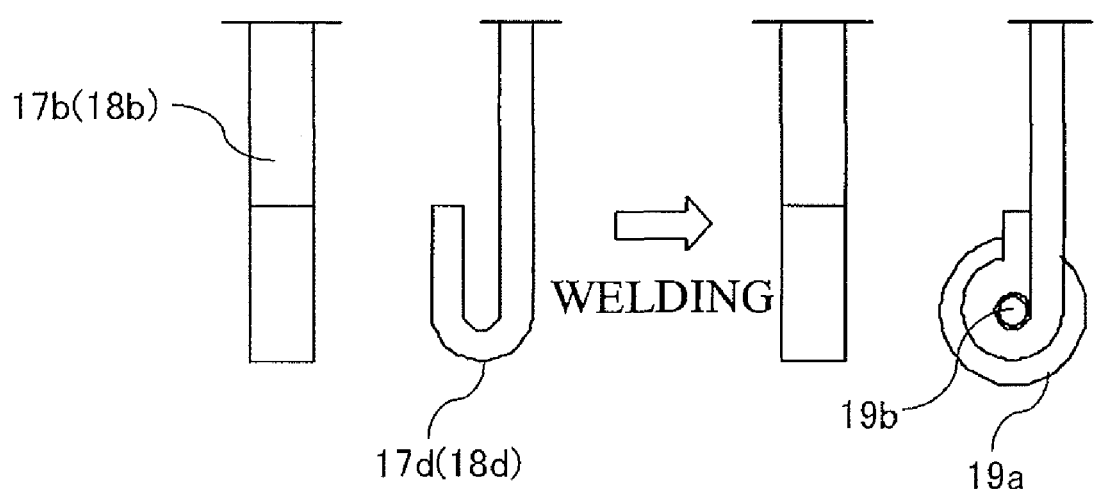
FIG. 9 is a diagram illustrating an exposed portion of the metal terminal of a flow rate measuring apparatus according to Embodiment 5 of the present invention.

FIG. 9 is a diagram illustrating the exposed portion 17b or 18b of the metal terminal 17 or 18 of the flow rate measuring apparatus according to Embodiment 5 of the present invention. In this Embodiment 5, distal ends of the exposed portions 17b and 18b of the metal terminals 17 and 18 are provided with folded portions 17d and 18d. The lead wires 19b of the fluid temperature sensing element 19 are inserted in the folded portions 17d and 18d and are bonded to the same by squeezing and welding.

With this bonding structure, risk of dropping out of the fluid temperature sensing element 19 can be avoided in the welding process or when it is mounted on the engine. Further, they are bonded so that the folded portions 17d and 18d surround the lead wire 19b of the fluid temperature sensing element 19. Therefore, the area of bonded surface can be increased, and hence bonding strength can be improved.

As described above, according to Embodiment 5, the folded portions are formed on the distal ends of the exposed portions of the metal terminals, and the lead wires of the fluid temperature sensing element are inserted in the folded portions so as to be bonded. As a result, the improvement of mechanical strength of the flow rate measuring apparatus described above in Embodiment 1 can be realized more effectively.

Embodiment 6

FIGS. 10A and 10B are a rear view and a diagram viewed from upstream in the main stream direction 4 of the flow rate measuring apparatus according to Embodiment 6 of the present invention. In this Embodiment 6, a first deformation prevention structural member 20a that is a hood-like protrusion is formed on the outer wall surface 15c of the side face of the bypass passage 15 on the distal end of the main body portion 11 in the insertion direction than the exposed portions 17b and 18b of the metal terminals 17 and 18.

The height of the first deformation prevention structural member 20a in the direction perpendicular to the outer wall surface 15c of the side face of the bypass passage 15 (i.e., the height corresponding to "H1" in FIG. 10B) is equal to or larger than the height of the temperature sensing portion 19a of the fluid temperature sensing element 19 in the same direction. Other structures are the same as those in Embodiment 1 described above.

Figure 10:
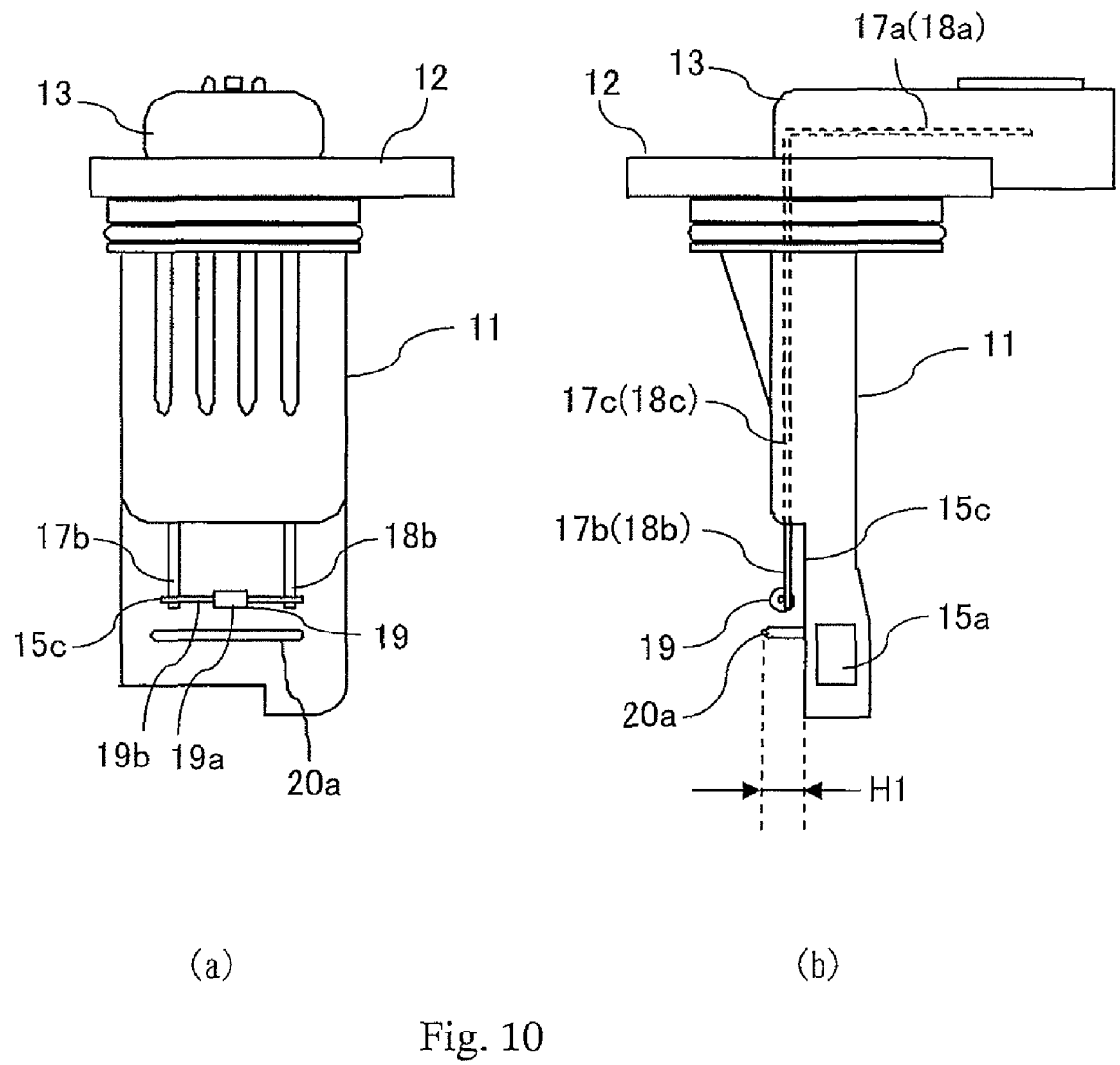
FIGS. 10A and 10B are a rear view and a diagram viewed from upstream in the main stream direction of a flow rate measuring apparatus according to Embodiment 6 of the present invention.

As illustrated in FIG. 10, in this Embodiment 6, the hood-like first deformation prevention structural member 20a is formed on the outer wall surface 15c of the side face of the bypass passage 15 on the distal end of the main body portion 11 in the insertion direction than the exposed portions 17b and 18b of the metal terminals 17 and 18. This first deformation prevention structural member 20a can prevent the fluid temperature sensing element 19 from contacting the wall of the pipe 1 when the flow rate measuring apparatus 10 is inserted in the pipe 1 through the apparatus inserting hole 2. As a result, it is possible to avoid a risk of bending the lead wire 19b of the fluid temperature sensing element 19 or the exposed portions 17b and 18b of the metal terminals 17 and 18, or breakage of the temperature sensing portion 19a of the fluid temperature sensing element 19.

As described above, according to Embodiment 6, because the first deformation prevention structural member is provided, improvement of mechanical strength of the flow rate measuring apparatus described above in Embodiment 1 can be realized more effectively.

Embodiment 7

Figure 11:
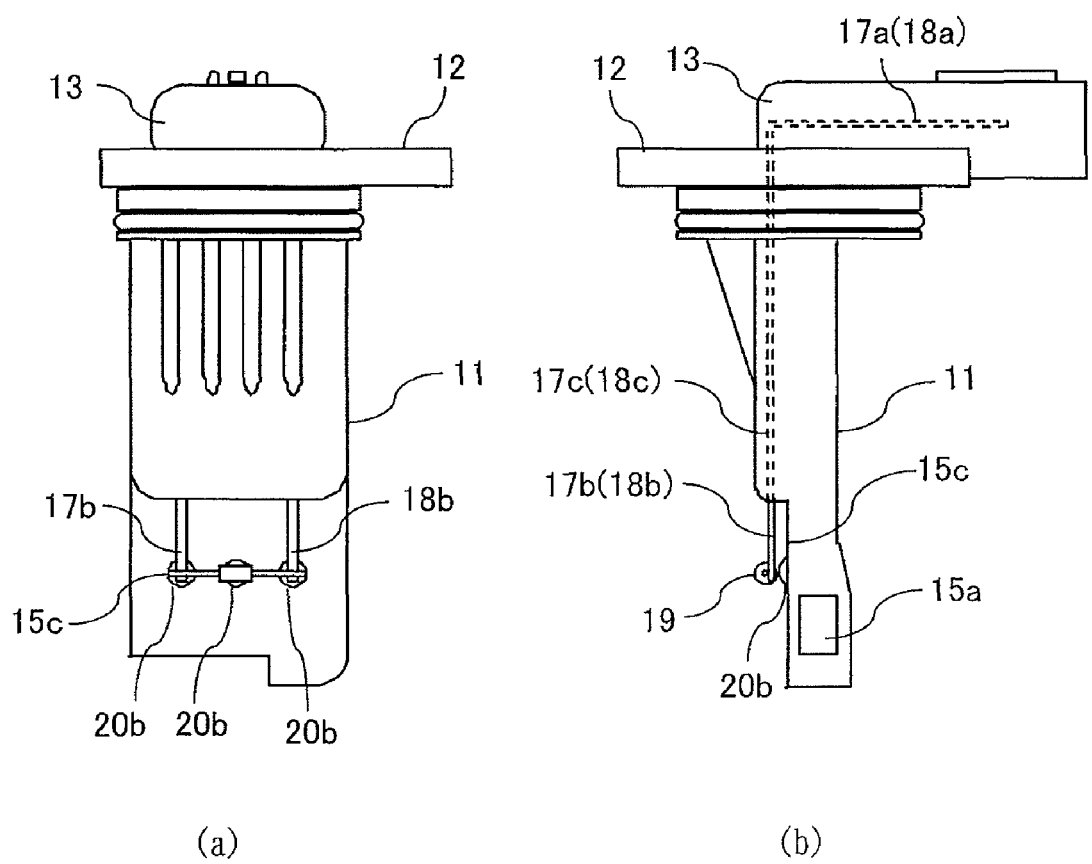
FIGS. 11A and 11B are a rear view and a diagram viewed from upstream in the main stream direction of a flow rate measuring apparatus according to Embodiment 7 of the present invention.

FIG. 11 is a rear view and a diagram viewed from upstream in the main stream direction 4 of the flow rate measuring apparatus according to Embodiment 7 of the present invention. In this Embodiment 7, second deformation prevention structural members 20b are formed at a portion on the outer wall surface 15c of the side face of the bypass passage 15 opposed to the exposed portions 17b and 18b of the metal terminals 17 and 18, and at a portion on the outer wall surface 15c of the side face of the bypass passage 15 opposed to the temperature sensing portion 19a of the fluid temperature sensing element 19. Other structures are the same as those in Embodiment 1 described above.

As illustrated in FIG. 11, in this Embodiment 7, the second deformation prevention structural members 20b are formed at a portion on the outer wall surface 15c of the side face of the bypass passage 15 opposed to the exposed portions 17b and 18b of the metal terminals 17 and 18, and at a portion on the outer wall surface 15c of the side face of the bypass passage 15 opposed to the temperature sensing portion 19a of the fluid temperature sensing element 19. The second deformation prevention structural members 20b can prevent the exposed portions 17b and 18b and the lead wire 19b of the fluid temperature sensing element 19 from being deformed when vibration or external force is applied to the outer wall surface 15c of the side face of the bypass passage 15 in the direction perpendicular to the surface.

As described above, according to Embodiment 7, because the second deformation prevention structural member is provided, improvement of mechanical strength of the flow rate measuring apparatus described above in Embodiment 1 can be realized more effectively.

Note that FIG. 11 illustrates three dome-like second deformation prevention structural members 20b, but the number and the shape there of are not limited. As long as they function as the deformation prevention structural members, other number and shape may be adopted. In addition, it is also possible to adopt the first deformation prevention structural member 20a described above in Embodiment 6 together with the second deformation prevention structural members 20b of this Embodiment 7.

Embodiment 8

FIGS. 12A and 12B are a rear view and a diagram viewed from upstream in the main stream direction 4 of the flow rate measuring apparatus according to Embodiment 8 of the present invention. In this Embodiment 8, a deformation prevention structural member 20c is formed in the region on the outer wall surface 15c of the side face of the bypass passage 15 between the exposed portions 17b and 18b of the metal terminals 17 and 18. The height of the deformation prevention structural member 20c in the direction perpendicular to the outer wall surface 15c of the side face of the bypass passage 15 (i.e., the height corresponding to "H2" illustrated in FIG. 12B) is equal to or larger than the height of the temperature sensing portion 19a of the fluid temperature sensing element 19. Other structures are the same as those in Embodiment 1 described above.

Figure 12:
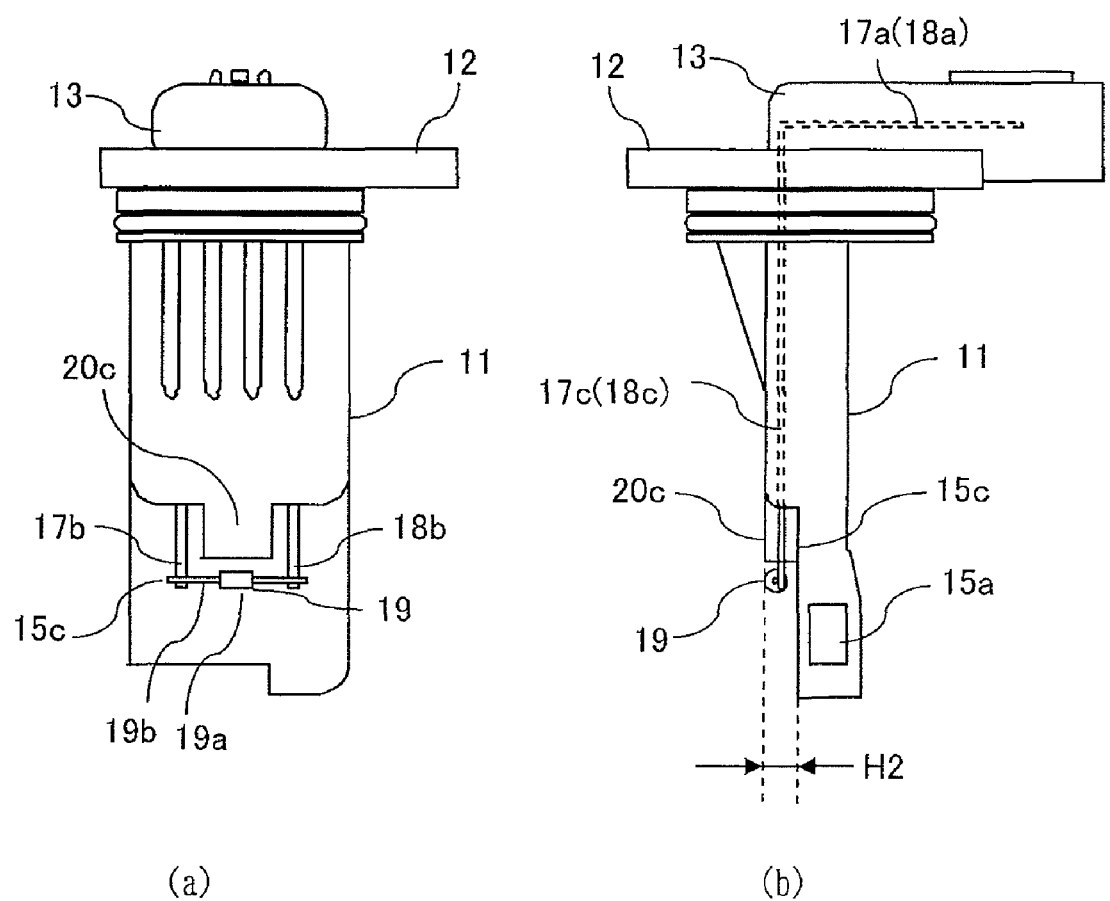
FIGS. 12A and 12B are a rear view and a diagram viewed from upstream in the main stream direction of a flow rate measuring apparatus according to Embodiment 8 of the present invention.

As illustrated in FIG. 12, in this Embodiment 8, a deformation prevention structural member 20c is formed in the region on the outer wall surface 15c of the side face of the bypass passage 15 between the exposed portions 17b and 18b of the metal terminals 17 and 18. Because this deformation prevention structural member 20c is provided, it is possible to prevent a risk of bending the lead wire 19b of the fluid temperature sensing element 19 or the exposed portions 17b and 18b of the metal terminals 17 and 18, or breakage thereof by grabbing by mistake the part where the fluid temperature sensing element 19 is arranged when the flow rate measuring apparatus 10 is handled.

As described above, according to Embodiment 8, because the third deformation prevention structural member is provided, improvement of mechanical strength of the flow rate measuring apparatus described above in Embodiment 1 can be realized more effectively.

Note that it is possible to adopt the first deformation prevention structural member 20a described above in Embodiment 6 or the second deformation prevention structural member 20b described above in Embodiment 7, together with the third deformation prevention structural member 20c of this Embodiment 8. Further, it is possible to adopt all the first deformation prevention structural member 20a, the second deformation prevention structural members 20b, and the third deformation prevention structural member 20c.

In addition, the cases where the concrete structures of the above Embodiments 2 to 8 are combined with the structure of Embodiment 1 are described above, but the present invention is not limited to those combinations. It is possible to combine one of the structures of Embodiments 2 to 8 with other one or more structures of Embodiments 2 to 8 so that similar effects can be obtained.

What is claimed is:

1. A flow rate measuring apparatus, comprising:
 a connector portion arranged outside a main passage in which fluid to be measured flows, for sending and receiving a signal externally;
 a main body portion which is extended from the connector portion to an inside of the main passage;
 a bypass passage which is formed inside the main body portion and to which a part of the fluid to be measured flowing in the main passage is led to flow;
 a flow rate sensing element which is arranged inside the bypass passage and has a flow rate detection portion on a surface thereof;
 a control circuit which drives the flow rate sensing element and processes a detection signal;
 a pair of metal terminals each of which includes an end portion connected to the connector, an embedded portion molded integrally with a resin portion constituting the main body portion, and an exposed portion exposed in the main passage; and
 a fluid temperature sensing element which is electrically connected between the exposed portions of the pair of metal terminals so as to be exposed in the main passage and includes a temperature sensing portion for sensing temperature of the fluid to be measured flowing in the main passage, wherein
 the fluid temperature sensing element is arranged at a position apart from an outer wall surface of a side face of the bypass passage, and
 the temperature sensing portion is arranged at a center between the pair of metal terminals exposed in the main passage by the same length or between extension lines thereof.

2. A flow rate measuring apparatus according to claim 1, wherein the exposed portions of the pair of metal terminals are formed so that a width direction thereof is parallel to a flowing direction of the fluid to be measured that flows in the main passage.

3. A flow rate measuring apparatus according to claim 1, wherein the embedded portions of the pair of metal terminals have a meandering shape.

4. A flow rate measuring apparatus according to claim 2, wherein the embedded portions of the pair of metal terminals have a meandering shape.

5. A flow rate measuring apparatus according to claim 1, wherein a part of the embedded portions of the pair of metal terminals is exposed to the outer wall surface of the main body portion so as to be opposed to the fluid to be measured that flows in the main passage.

6. A flow rate measuring apparatus according to claim 2, wherein a part of the embedded portions of the pair of metal terminals is exposed to the outer wall surface of the main body portion so as to be opposed to the fluid to be measured that flows in the main passage.

7. A flow rate measuring apparatus according to claim 1, wherein widths of the embedded portions of the pair of metal terminals are smaller than at least widths of the exposed portions of the metal terminals.

8. A flow rate measuring apparatus according to claim 2, wherein widths of the embedded portions of the pair of metal terminals are smaller than at least widths of the exposed portions of the metal terminals.

9. A flow rate measuring apparatus according to claim 1, wherein the exposed portions of the pair of metal terminals have folded portions on the end portion thereof for surrounding lead wires of the fluid temperature sensing element so as to be bonded thereto.

10. A flow rate measuring apparatus according to claim 2, wherein the exposed portions of the pair of metal terminals have folded portions on the end portion thereof for surrounding lead wires of the fluid temperature sensing element so as to be bonded thereto.

11. A flow rate measuring apparatus according to claim 1, further comprising a deformation prevention structural member for preventing deformation or breakage of at least one of the exposed portions of the pair of metal terminals and the fluid temperature sensing element, the deformation prevention structural member being formed on the outer wall surface of the side face of the bypass passage on a side where the fluid temperature sensing element is arranged.

12. A flow rate measuring apparatus according to claim 2, further comprising a deformation prevention structural member for preventing deformation or breakage of at least one of the exposed portions of the pair of metal terminals and the fluid temperature sensing element, the deformation prevention structural member being formed on the outer wall surface of the side face of the bypass passage on a side where the fluid temperature sensing element is arranged.

13. A flow rate measuring apparatus according to claim 11, wherein the deformation prevention structural member is a protrusion formed on the outer wall surface of the side face of the bypass passage at a vicinity of the exposed portions of the pair of metal terminals.

14. A flow rate measuring apparatus according to claim 12, wherein the deformation prevention structural member is a protrusion formed on the outer wall surface of the side face of the bypass passage at a vicinity of the exposed portions of the pair of metal terminals.

* * * * *